(12) United States Patent
Decaumont et al.

(10) Patent No.: US 6,845,199 B2
(45) Date of Patent: Jan. 18, 2005

(54) OPTICAL FIBER CABLE INCLUDING A HYDROGEN-ABSORBING COMPOSITION

(75) Inventors: Anne Decaumont, Bretigny sur Orge (FR); Xavier Andrieu, Bretigny sur Orge (FR)

(73) Assignee: Alcatel, Paris (FR)

(*) Notice: Subject to any disclaimer, the term of this patent is extended or adjusted under 35 U.S.C. 154(b) by 20 days.

(21) Appl. No.: 10/455,437

(22) Filed: Jun. 6, 2003

(65) Prior Publication Data

US 2004/0037520 A1 Feb. 26, 2004

(30) Foreign Application Priority Data

Jun. 6, 2002 (FR) .............................. 02 06963

(51) Int. Cl.⁷ ................................................ G02B 6/44
(52) U.S. Cl. ...................................................... 385/100
(58) Field of Search ................................. 385/100–114

(56) References Cited

U.S. PATENT DOCUMENTS

| | | | |
|---|---|---|---|
| 3,299,016 A | 1/1967 | Sonnenfeld | |
| 5,258,435 A | 11/1993 | Huggins et al. | |
| 5,686,520 A | 11/1997 | Olsen et al. | |
| 2003/0002828 A1 | 1/2003 | Andrieu et al. | |

FOREIGN PATENT DOCUMENTS

| | | |
|---|---|---|
| EP | 0 402 895 A1 | 12/1990 |
| EP | 0 632 301 A1 | 1/1995 |
| WO | WO 01/46736 A1 | 6/2001 |

*Primary Examiner*—Khiem Nguyen
(74) *Attorney, Agent, or Firm*—Sughrue Mion, PLLC

(57) ABSTRACT

The present invention concerns an optical fiber cable including a hydrogen-absorbing composition comprising a catalyst and a hydrogen-absorbing component, characterized in that said hydrogen-absorbing component is a mixture of a non-absorbing polymer matrix and a hydrogen-absorbing organic compound including at least one carbon-carbon triple bond.

17 Claims, 2 Drawing Sheets

OPTICAL FIBER CABLE INCLUDING A HYDROGEN-ABSORBING COMPOSITION

The present invention relates to an optical fiber cable including a composition that is capable of absorbing hydrogen.

An optical fiber comprises a portion acting as a waveguide, generally formed from silica which may be doped, composed of a core surrounded by cladding. The waveguide portion is normally covered with a protective coating, usually formed from a polymer and possibly multilayered, to protect it from its environment. That coating can be colored to distinguish the fibers from one another. Such a coated fiber is normally intended for incorporation in a cable, in particular for telecommunications purposes. A telecommunications cable is a cable comprising at least one coated optical fiber and a housing tube, possibly multilayered, disposed about the fiber. The gap between the optical fiber and the housing tube is usually filled with a filling gel.

Attenuation of optical signal transmission due to the absorption of hydrogen by the silica matrix in optical fibers is a known problem. Hydrogen can be generated by the components of the cable themselves or by an external phenomenon, for example corrosion. The prejudicial effect of hydrogen on optical fibers causes the optical and mechanical performance of the fibers with which the hydrogen comes into contact to degrade. As a result, the partial pressure of hydrogen must be minimized to preserve the expected life of the cable. Said prejudicial effect exists even if hydrogen is present in only trace amounts in the cable; thus, it is very important to remove all traces of hydrogen, even when the cable is in a hydrogen-saturated atmosphere. In order to remove hydrogen from the fiber's environment, substances that can fix hydrogen are generally incorporated into some of the layers of the coating. A number of solutions have been mentioned.

French patent FR-A-2 803 045 describes an optical fiber comprising, in the outer protective coating of the waveguide portion, an intermetallic compound formed from at least two metals, in which the plateau pressure during hydride formation is $5 \times 10^{-2}$ atmospheres (atm; 1 atm=$1.013 \times 10^5$ pascals (Pa)) or less, measured using a pressure composition temperature (PCT) method. The compound has formula $AB_xM_y$, in which:

A is constituted by at least one element from columns IIa, IIIb or IVb of the periodic table (CAS version);

B is constituted by at least one element from columns Vb, VIII or IIIa from the periodic table (CAS version); and M contains at least one element from columns VIb, VIIb, Ib or IIb from the periodic table (CAS version); in which $0 \leq x \leq 10$; and $0 \leq y \leq 3$ if A contains only elements from column IIa; or $0.2 \leq y \leq 3$ if A contains at least one element from column IIIb or IVb.

An optical fiber cable containing such an intermetallic compound is also described. Its hydrogen storage capacity is limited to its hydride capacity. The quantity of hydride that can be introduced is limited in order not to degrade the mechanical characteristics of the coating. For that reason, the absorption capacity of the coating is insufficient for requirements.

European patent EP-A-0 632 301 describes an optical fiber telecommunications cable having a core which comprises at least one optical fiber in a housing tube. The cable includes a hydrogen-absorbing composition in at least a portion of its inner volume. That document proposes using an absorbent composition comprising a catalyst such as a transition metal, a salt or an organic or mineral complex of a transition metal, and a particular hydrocarbon-containing compound. At least 90% of the hydrocarbon compound is constituted by a non-aromatic unsaturated hydrocarbon that is free of silicon, which is an unsaturated hydrocarbon that is not obtained by polymerizing monomers containing conjugated dienes, the unsaturated hydrocarbon having:

i) a molecular mass distribution with a mean that is in a narrow range so that it exhibits no significant phase separation phenomenon by settling or by chromatography on a fibrous support;

ii) a viscosity at ambient temperature that is in the range 500 centistokes (cSt) to 70000 cSt;

iii) a viscosity at ambient temperature that is less than 70000 cSt after aging a thin layer by exposure to air for at least 7 days at 100° C.

That hydrocarbon contains long chains, the double bonds being positioned at the chain ends. The viscosity of such an absorbing composition varies with the quantity of hydrogen absorbed and that is no longer acceptable to the end user.

The aim of the present invention is to provide a hydrogen-absorbing composition intended for use in an optical fiber cable, wherein the viscosity remains substantially constant regardless of the quantity of hydrogen absorbed.

The present invention provides an optical fiber cable including at least one optical fiber surrounded by a coating, a housing tube and a hydrogen-absorbing composition comprising a catalyst and a hydrogen-absorbing component (getter), characterized in that said hydrogen-absorbing component is a mixture of a non-absorbing polymer matrix and a hydrogen-absorbing organic compound including at least one carbon-carbon triple bond.

The organic hydrogen-absorbing compound of the present invention is an acetylenic hydrocarbon, i.e., an acyclic hydrocarbon (linear or branched) or a cyclic hydrocarbon (with or without a side chain containing one or more carbon-carbon triple bonds). In the presence of a hydrogenation catalyst, the hydrogen adds across the triple bond.

The organic compound of the invention includes an acetylenic bond and derives from acetylene by substitution of at least one hydrogen atom. In a first implementation, the organic compound has general formula: $R^1$—C≡C—$R^2$, in which $R^1$ and $R^2$, which may be identical or different, are selected from a linear or branched acyclic hydrocarbon, a cyclic hydrocarbon, a saturated hydrocarbon, an unsaturated hydrocarbon, and a hydrocarbon substituted with a heteroatom.

In a second implementation, the organic compound has general formula: $R^1$—C≡C—$R^2$, in which $R^1$ is a hydrogen atom and $R^2$ is selected from a linear or branched acyclic hydrocarbon, a cyclic hydrocarbon, a saturated hydrocarbon, an unsaturated hydrocarbon, and a hydrocarbon substituted with a heteroatom.

The saturated or unsaturated cyclic hydrocarbon can be selected from a monocyclic hydrocarbon, a polycyclic hydrocarbon, a heterocyclic hydrocarbon, an aromatic hydrocarbon, a condensed hydrocarbon, a spiranic hydrocarbon, and a bridged hydrocarbon.

The aliphatic or cyclic hydrocarbon can optionally be substituted with a foreign atom or heteroatom, different from C or H.

The organic compound of the invention can be in solid or liquid form.

Preferably, the organic hydrogen-absorbing compound is selected from 1,4-bis(phenylethynyl)benzene, 1,2-bis (phenylethynyl)benzene, 9,10-bis(phenylethynyl) anthracene and 5,12-bis(phenylethynyl)naphthacene, which have the following formulae:

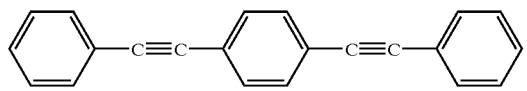

1,4-BIS(PHENYLETHYNYL)BENZENE

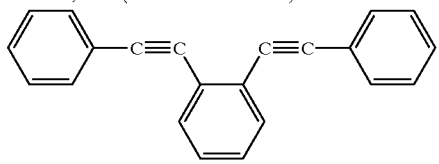

1,2-BIS(PHENYLETHYNYL)BENZENE

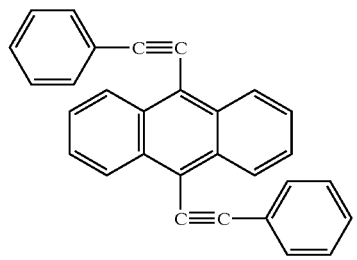

9,10-Bis(phenylethynly)anthracene

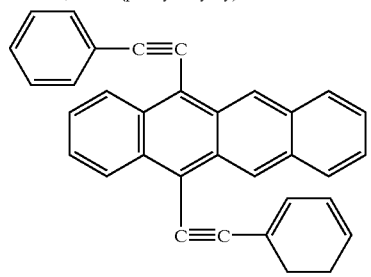

5,12-Bis(phenylethynly)naphthacene

Preferably again, the organic hydrogen-absorbing compound of the invention is 1,4-bis(phenylethynyl)benzene (DEB). This crystalline solid has the advantage of being neither toxic nor mutagenic. Thus, one mole of 1,4-bis (phenylethynyl)benzene can react with four hydrogen atoms. Its absorption capacity is 240 cubic centimeters (cm$^3$) to 330 cm$^3$ of hydrogen per gram. The absorption mechanism is based on a sequential series of hydrogen additions across the triple bonds, each step having its own rate constant.

DEB melts at 179° C. Once completely hydrogenated, it melts at 87° C. It remains a solid regardless of the degree of hydrogenation and its viscosity varies very little. By mixing it with a matrix that does not react, a composition is obtained the viscosity of which stays substantially constant.

Advantageously, the organic hydrogen-absorbing compound represents at most 25% by weight of said absorbing component, preferably at most 10% by weight of said hydrogen-absorbing component. Once the organic compound has been mixed with a matrix that acts as a diluent, an absorbing component is obtained the cost of which is lower than that of the organic compound.

Known catalysts can be used as the hydrogenation catalyst. Preferably, a transition metal, a complex, or a transition metal salt is selected. As an example, platinum Pt or palladium Pd dispersed on activated charcoal or Raney nickel can be used.

The matrix is selected from the usual polymers which are suitable for localizing the composition in the cable.

The composition of the invention can be used as a filling gel in an optical fiber cable. In this case, the matrix is preferably a silicone material or a polyolefinic material, more preferably a saturated material. As an example, the silicone material can be an organic saturated silicone type material corresponding to the following general formula:

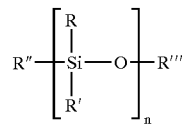

In this formula, R and R' may be identical or different and represent alkyl, alkenyl or aryl groups; R" and R"' may be identical or different and represent an alkenyl group, and n is a whole number. In the above formula, R and R' can also be selected from saturated or unsaturated aliphatic radicals and aromatic radicals; in this case, R" and R"' are unsaturated aliphatic radicals.

The hydrogen-absorbing composition of the invention can also be used to produce the housing tube surrounding the fiber or fibers forming the cable. In this case, the matrix is preferably a thermoplastic polymer such as polybutylene terephthalate (PBTP).

In a particular implementation of the invention, the composition can be deposited on the inner surface of the housing tube in the form of a layer.

Said composition can also be used to produce the secondary coating of an insulated optical fiber or the cladding for a strip of a plurality of optical fibers. The matrix is then preferably a polyurethane (PU) acrylate.

The invention also provides an optical component comprising a hydrogen-absorbing composition as described above.

It may be a component that is intended for both terrestrial and undersea applications. The term "optical component" means a component containing an optical fiber that acts as a filter or as an optical amplifier. The composition is then preferably in the coating of the optical fiber.

Other characteristics and advantages of the present invention become clear from the following non-limiting examples given, of course, by way of illustration, and made with reference to the accompanying figures in which.

EXAMPLE 1

Figure 1:
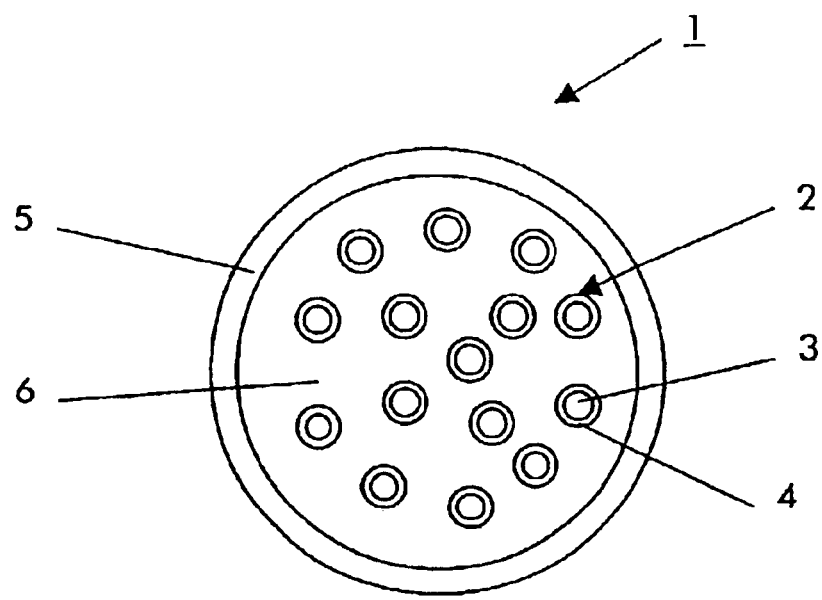
FIG. 1 is a cross sectional view of an optical fiber cable including a composition in accordance with the invention as a filling gel.

The optical fiber cable 1 shown in FIG. 1 is composed of optical fibers 2 each comprising a waveguide portion 3 surrounded by a protective coating 4. The optical fibers 2 are surrounded by a common housing tube 5. The volume left free between the optical fibers 2 and the housing tube 5 is filled with a filling gel 6 which prevents the fibers from moving, protects them against shocks, and contributes to keeping the cable moisture-tight.

In cable 1, the filling gel 6 was constituted by a hydrogen-absorbing composition of the invention. The catalyst was formed from palladium Pd deposited on activated charcoal in an amount of 5% by weight of Pd. The hydrogen-absorbing component comprised a hydrocarbon-based matrix, reference "OPTIFILL 5300", supplied by BP, and a hydrogen-absorbing compound which was a DEB (1,4-bis (phenylethynyl)benzene), reference "S870927", supplied by SIGMA-ALDRICH.

The hydrogen-absorbing compound was first mechanically mixed with the catalyst, for example in a jar for several hours, for example in respective proportions of 75% by weight of the compound and 25% by weight of catalyst. Said mixture was then mechanically incorporated into the polymer matrix, for example using a mill, in respective proportions of 5% by weight of mixture and 95% by weight of polymer matrix, for example. The composition of the invention was then obtained, which was used as a filling gel and placed in the cable in the free space inside the housing tube.

EXAMPLE 2

For the purposes of comparison, an optical fiber cable analogous to that described in Example 1 of FR-A-2 803 045 was constructed. Said cable comprised a housing tube including optical fibers. A filling gel occupied the space around the optical fibers inside the housing tube.

The intermetallic compound used to absorb the hydrogen was incorporated into the filling gel placed inside the housing tube. Said gel could be a commercially available hydrocarbon-based gel such as that with reference "OPTIFILL 5300" from BP. The composition was such that 5% of the powdered intermetallic compound, milled in advance to a diameter of 30 micrometers ($\mu$m), was introduced into the gel using a Werner arm mill. The gel/powdered intermetallic compound ensemble was then placed in the cable.

EXAMPLE 3

For the purposes of comparison, an optical fiber cable was produced as follows. Said cable comprised a housing tube and included optical fibers. A filling gel occupied the space surrounding the optical fibers inside the housing tube. Said filling gel was a commercially available material based on polybutene containing a catalyst, reference "R1865", supplied by MASTER ADHESIVES.

EXAMPLE 4

Figure 2:
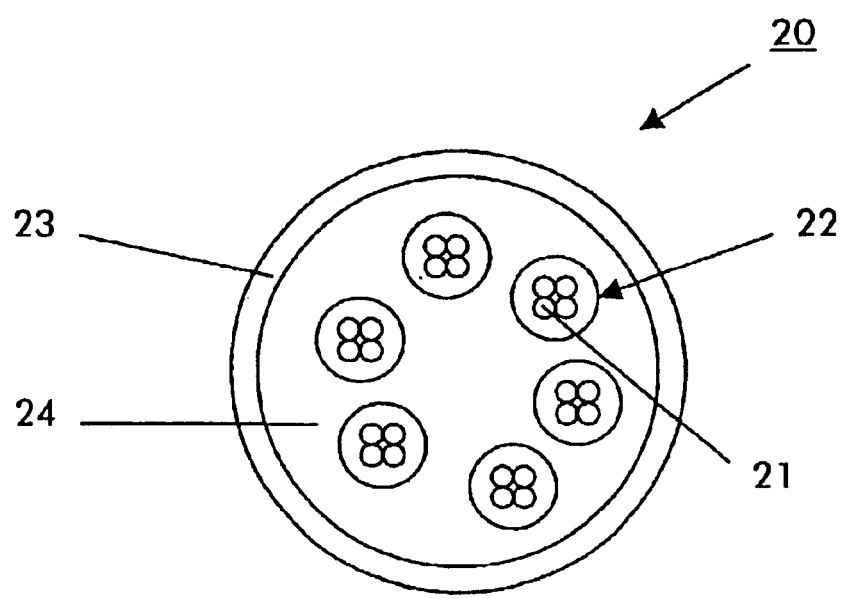
FIG. 2 is a cross sectional view of a variation of an optical fiber cable including a housing tube constituted by a composition in accordance with the present invention.

FIG. 2 shows a further type of optical fiber cable 20 comprising coated optical fibers 21 assembled into bundles 22 held by a sheath. The bundles 22 are assembled into a common housing tube to form a cable 20. The volume left free between the bundles 22 of optical fibers 21 and the housing tube 23 is filled with a filling gel 24 which is an organic saturated silicone type compound.

In cable 20, the housing tube 23 was constituted by a hydrogen-absorbing composition of the invention. The catalyst is analogous to that in Example 1. The hydrogen-absorbing component comprised a matrix formed from a thermoplastic polymer, a PBTP (polybutylene terephthalate) with reference "VESTODUR 3000" and a hydrogen-absorbing compound, a DEB with reference "S870927" supplied by SIGMA ALDRICH.

Firstly, the hydrogen-absorbing compound was mechanically mixed with the catalyst, for example in a jar for several hours, for example in respective proportions by weight of 75% of compound and 25% of catalyst. This mixture was then mechanically incorporated into the thermoplastic polymer matrix, for example using a "Brabender" type mixer, in respective proportions of 5% by weight of mixture and 95% by weight of thermoplastic polymer, for example, optionally accompanied by a lubricant to attenuate the abrasive effect, and by surfactants. The composition of the invention was obtained, which was used to produce the cable housing tube, for example by extrusion.

EXAMPLE 5

For the purposes of comparison, an optical fiber cable analogous to that described in Example 2 of FR-A-2 803 045 was produced. Said cable comprised a housing tube formed from a thermoplastic material and included the optical fibers. A filling gel occupied the space around the optical fibers inside the housing tube. The intermetallic compound used to absorb the hydrogen was incorporated into the thermoplastic material of the housing tube.

The thermoplastic could, for example, be formed from PBTP, reference "VESTODUR 3000", in the form of granules, and the intermetallic compound was in the form of a 30 $\mu$m powder. The thermoplastic and the intermetallic compound powder were mixed using a Brabender type mixer, optionally accompanied by a lubricant to attenuate the abrasive effect of the intermetallic compound, and surfactants. The composition was such that 5% by weight of the intermetallic compound was introduced into the thermoplastic prior to extruding the thermoplastic/intermetallic compound ensemble.

EXAMPLE 6

Figure 3:
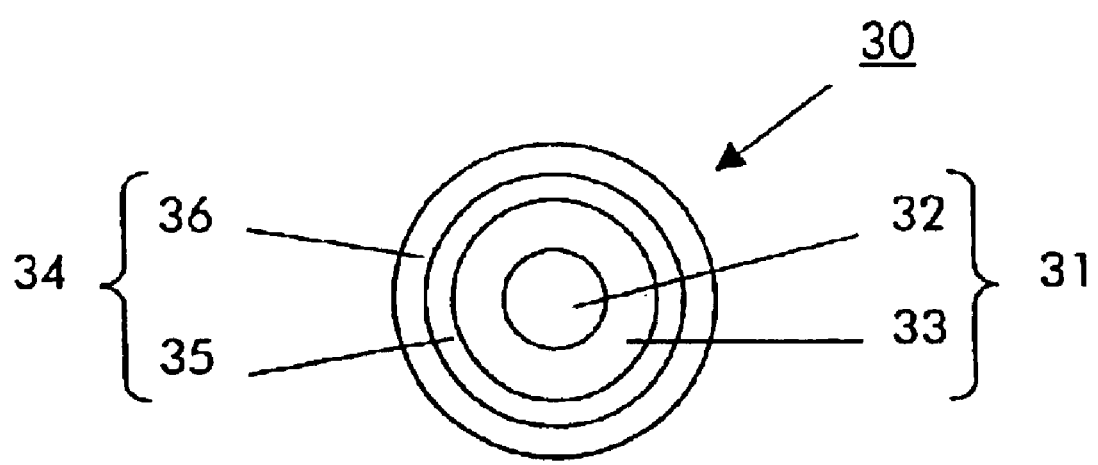
FIG. 3 is a cross sectional view of an optical fiber with a coating having an outer layer which is constituted by a composition in accordance with the present invention.

An optical fiber 30 is shown in cross section in FIG. 3, for use in a cable of an analogous type to that shown in FIG. 1 or that shown in FIG. 2. It comprises a waveguide portion 31, composed of a core 32 and cladding 33, and a coating 34 surrounding the waveguide portion 31. The coating 34 comprises an inner layer 35 in contact with the waveguide portion 31 and an outer layer 36.

In fiber 30, the outer layer 36 was constituted by a hydrogen-absorbing composition in accordance with the invention. The catalyst was analogous to that described in Example 1. The hydrogen-absorbing component comprised a polyurethane acrylate matrix, reference "DSM 3471-2-102" and the hydrogen-absorbing compound was a DEB with reference number "S870927" supplied by SIGMA-ALDRICH.

The composition was prepared as described in Example 1. It was used to produce the outer layer of the fiber coating. A cable was produced using fibers 30. Said cable was analogous to cable 1, with the exception that the filling gel was a conventional gel which was an organic saturated silicone type compound.

EXAMPLE 7

For the purposes of comparison, an optical fiber cable analogous to that described in Example 5 including optical fibers analogous to that described in Example 3 of FR-A-2 803 045 was produced. Said cable comprised a housing tube and a filling gel occupied the space around the optical fibers inside the housing tube. The optical fiber comprised a waveguide portion and a coating comprising an inner layer and an outer layer.

The intermetallic compound was incorporated into a polymer matrix, which was formed from a polyurethane acrylate, reference "DSM 3471-2-102". The mixture of the polymer matrix and the intermetallic compound was deposited around the optical fiber as a secondary coating for the fiber employing a coating method. The coating thickness was 30 μm and the mean diameter of the intermetallic compound was 5 μm. The composition was such that 3% by weight of the intermetallic compound was introduced into the polymer matrix prior to deposition.

The hydrogen absorption capacity of the various compositions described above was determined. The results are expressed in cubic centimeters ($cm^3$) per gram (g) of composition under standard temperature and pressure conditions (STP) and are shown in the table below:

TABLE

| Example | Hydrogen absorption capacity, $cm^3$ (STP) per gram of composition |
|---|---|
| 1 | 10.4 |
| 2 | 7.5 |
| 3 | 5.4 |
| 4 | 8.6 |
| 5 | 6.2 |
| 6 | 9.8 |
| 7 | 7.0 |

The hydrogen absorption capacities of the compositions of the invention described in Examples 1, 4 and 6 were substantially higher than those of known prior art positions (Examples 2, 3, 5 and 7).

For comparison purposes, the compositions described in Examples 2 to 6 of EP-A-0 632 301, corresponding to polybutenes with different characteristics, resulted in absorption capacities in the range 0.51 $cm^3$ (STP)/g to 2.24 $cm^3$ (STP)/g.

EXAMPLE 8

A cable analogous to that described in Example 1 was prepared, with the exception that the organic hydrogen-absorbing compound was 1,2-bis(phenylethynyl)benzene.

EXAMPLE 9

A cable analogous to that described in Example 1 was prepared, with the exception that the organic hydrogen-absorbing compound was 9,10-bis(phenylethynyl) anthracene.

EXAMPLE 10

A cable analogous to that described in Example 1 was prepared, with the exception that the organic hydrogen-absorbing compound was 5,12-bis(phenylethynyl) naphthacene.

The hydrogen absorption capacities of the compositions of Examples 8, 9 and 10 equaled or were superior to those of the prior art compositions.

What is claimed is:

1. An optical fiber cable including a hydrogen-absorbing composition comprising a catalyst and a hydrogen-absorbing component, characterized in that said hydrogen-absorbing component is a mixture of a non-absorbing polymer matrix and a hydrogen-absorbing organic compound including at least one carbon-carbon triple bond.

2. A cable according to claim 1, in which said organic compound has general formula: $R^1$—C≡C—$R^2$, in which $R^1$ is a hydrogen atom and $R^2$ is selected from a linear or branched acyclic hydrocarbon, a cyclic hydrocarbon, a saturated hydrocarbon, an unsaturated hydrocarbon and a hydrocarbon substituted with a heteroatom.

3. A cable according to claim 1, in which said organic compound has general formula: $R^1$—C≡C—$R^2$, in which $R^1$ and $R^2$, which may be identical or different, are selected from a linear or branched acyclic hydrocarbon, a cyclic hydrocarbon, a saturated hydrocarbon, an unsaturated hydrocarbon and a hydrocarbon substituted with a heteroatom.

4. A cable according to claim 3, in which said organic compound is selected from 1,4-bis(phenylethynyl)benzene, 1,2-bis(phenylethynyl)benzene, 9,10-bis(phenylethynyl) anthracene and 5,12-bis(phenylethynyl)naphthacene.

5. A cable according to claim 1, in which said organic compound is in the solid or liquid form.

6. A cable according to claim 1, in which said organic compound represents at most 25% by weight of said absorbing component.

7. A cable according to claim 6, in which said organic compound represents at most 10% by weight of said absorbing component.

8. A cable according to claim 1, in which said catalyst is selected from a transition metal, a complex or a salt of a transition metal.

9. A cable according to claim 1, in which said composition is introduced between said optical fiber and said housing tube, constituting a filler gel.

10. A cable according to claim 9, in which said matrix is selected from a silicone material and a polyolefinic material.

11. A cable according to claim 1, in which said composition constitutes said housing tube.

12. A cable according to claim 11, in which said matrix is a thermoplastic polymer.

13. A cable according to claim 1, in which said composition constitutes the outer layer of said optic fiber coating.

14. A cable according to claim 1, in which said composition constitutes the cladding for an optical fiber strip.

15. A cable according to claim 13, in which said matrix is a polyurethane acrylate.

16. A cable according to claim 1, in which said composition is deposited on the inner surface of said housing tube in the form of a layer.

17. An optical fiber cable component comprising a hydrogen-absorbing composition according to claim 1.

* * * * *